Patented Oct. 11, 1938

2,132,485

UNITED STATES PATENT OFFICE 2,132,485

METHOD OF MAKING FOOD PRODUCTS

Samuel Levison, Evanston, Ill., assignor to Orchard Products Company, Chicago, Ill., a corporation of Illinois No Drawing. Application February 9, 1935, Serial No. 5,859

4 Claims. (Cl. 99—132)

The invention relates to food products and their methods of manufacture, and particularly to fruit jellies, jams, preserves, marmalades and the like and the manufacture thereof.

Heretofore there have been various processes followed in the making of jellies, jams and the like employing fruit or fruit juices, some of which have involved considerable work and difficulty in the preparation of the fruit or the fruit juices, such as washing the fruit, boiling it and finally straining the fruit through a cloth to assist in making a clear jelly. These consume a great deal of time, and following their steps stain the hands and usually soil the clothes of the worker. All of these difficulties are avoided by the use of the present invention.

For a great many years the process of making jelly consisted of dissolving sugar, that is cane sugar or beet sugar, i. e., sucrose, in the heated fruit juice and cooking the preparation until a jelly consistency was obtained, after which it was poured into suitable vessels, glasses, etc., and allowed to cool. This process has been followed by manufacturers and housewives for many years, although it was well known that as a result of the evaporation which takes place, there is considerable loss of the weight, volume, flavor and aroma of the fruit, whether crushed fruit or fruit juices be employed.

It is an object of the invention to produce fruit jellies, jams, preserves and the like having excellent taste, a brilliant color and without the loss or dissipation of any of the flavor or aroma of the fruit juice which is used in the herein described process. The fruit juice used in the present process is crystallized fruit juice as is produced when following the process of manufacture described and claimed in United States Letters Patent 1,686,670, issued October 9, 1928, to Herbert T. Leo. The process of the Leo patent consists in dehydrating a food substance capable of crystallizing with water of crystallization as, for instance, certain of the monosaccharides, and more especially the aldohexose sugars, and combining with the dehydrated substance a fruit juice in place of the water of crystallization. The crystallized fruit juice or solid flavoring material of the patent is preferably composed of about 80 parts of pure refined dextrose produced by the hydrolysis of corn starch and the addition of, preferably, about 20 parts of concentrated fruit juice to the dextrose which has been dehydrated. The fruit juice takes the place of the water of crystallization, the dextrose crystallizing out with the fruit juice, chemically or physically, combined with the dextrose molecules. After treating the dehydrated dextrose and the fruit juice in accordance with the disclosure of the patent a solid flavoring substance or material having the natural flavor of the fruit used is obtained.

It is a primary object of the present invention to use the solid flavoring material or crystallized fruit juice described in said patent with the various ingredients commonly used in making jellies, jams, marmalades and the like, other than fruit and fruit juices, care, however, being observed not to add the said solid flavoring material to the liquid prior to boiling, but to add it after the boiling has been completed.

It is an important object of the invention that the solid flavoring material which is used in following the steps of the present process be exposed to a minimum amount of heat when it is added to the liquid preparation.

It is another object of the present invention, and a very important one, to raise and increase the final soluble solid and acid content of the finished preparation without its being unduly heated.

Another object of the invention is that by the addition of the solid flavoring material last, in the case where crushed fruit or fruit juice, either fresh or canned, has been used in the old way whereby an appreciable amount of flavor and color is lost through boiling to the optimum point to produce a finished jelly, jam, preserve, or the like, the flavor and color of the final product is increased, augmented and enhanced.

An important feature of the present invention is to use a fruit juice combined with dehydrated and refined dextrose produced by the hydrolysis of corn starch instead of using sucrose (cane sugar or beet sugar) because by adding the solid flavoring material of the Leo patent last, it will go into solution due to its solubility characteristics and will increase the soluble solid content of the resultant or final jelly preparation, which would not be the case if sucrose (cane sugar or beet sugar) were used.

In the making of fruit jelly, jam and the like, there has been a departure from the old style of manufacture in the use of commercial pectin. By use of this pectin, jelly has been produced by regulating the amount of fruit juice that entered a given batch, in such a way as to obtain approximately 65% of soluble solids immediately upon solution of the sugar in the fruit juice and pectin mixture which was added to insure jellification. Such a process is described in Patent No. 1,304,166 issued May 20, 1919 to Robert Douglas.

The present invention marks a further advance in the making of fruit jelly, jam and the like. It also employs pectin and acid as well as sugar and water. The product of the present invention which relates to a sugar, water, pectin, acid jelly, jam or the like, is produced by dissolving powdered pectin or using a solution of pectin such as "Certo", in water, adding sugar (preferably sucrose, i. e., cane sugar, beet sugar) and some fruit acid, such as citric or tartaric acid, and cooking and boiling the same until approximately 65% soluble solids is attained.

To this hot liquid is added the solid flavoring material prepared according to the Leo patent which due to the solubility characteristics of dextrose used in its preparation goes into solution at once, imparting the color and flavor to the finished jelly due to the actual juice content of the fruited dextrose sugar or solid flavoring material. This operation increases the soluble solids of the sugar, water, acid, pectin jelly, which is distinctly different from the art heretofore practiced.

If cane sugar were used in place of dextrose, its solubility under the conditions of approximately 65% soluble solids in the presence of acid and pectin would be such that it would be relatively insoluble and not result in a perfect solution. Dextrose is different from sucrose (cane sugar, beet sugar) in that at elevated temperatures it is much more soluble than sucrose. If the solid flavoring material or fruited dextrose sugar were added at the same time as the sucrose (cane sugar, beet sugar) in the manufacturing of sugar, water, pectin, acid jelly and cooked to approximately 65% soluble solids, the resultant jelly would be decidedly and emphatically lacking in flavor and less brilliant in color than were the solid flavoring material of the Leo patent to have been added last.

As illustrating more specifically the manufacture of a food product utilizing the present invention, I will describe the making of a batch of jelly following the steps of the invention herein disclosed.

It will be understood, however, that the quantities and temperatures hereinafter mentioned serve merely as illustrations to explain the principle of the invention. Pour two and one-half cups of water in a pan, or other suitable container, which has been placed over a fire, and heat the same hot but not quite to a boiling point. To this heated water add about one ounce of dry prepared powdered fruit pectin containing corn sugar, pectin and fruit acid (citric, tartaric). Heat this solution to a boiling point, and stir the same vigorously with a spoon in order to eliminate lumping. A wooden spoon is preferably used so as not to impart any metallic taste to the finished product. Thereupon add three level cups of sugar and thoroughly stir the solution. The sugar dissolves in the solution when it is stirred and heated. The solution is then brought either to a boil or to a temperature of approximately 218 to 219 degrees F. The boiling should continue for a period of about three minutes or more in order to bring the mixture to the proper consistency. The pan or the receptacle containing the solution, which at this time is a water white solution, is then removed from the fire, the boiling process ceases, and thereupon the dry solid flavoring material manufactured according to the Leo patent, preferably in powdered form and weighing about two ounces, is mixed in the sugar, water, pectin, acid, unset jelly and it dissolves immediately upon being stirred.

It will be noted that before putting in the dry solid flavoring material, the boiling process has been discontinued and that after the dry flavoring material has been put in the solution, there is no further cooking, boiling or heating. Thereupon the preparation may be skimmed, poured into suitable containers, allowed to cool and set to a jelly and is then ready for consumption. It will therefore be seen that at no time in following out the steps of the process, is any flavor or color of the fruit juice which had been incorporated in this solid flavoring material boiled away or lost, but is retained. All of the natural flavor and color of the fruit juice being retained, a jelly of excellent taste, color, texture and brilliant appearance is produced.

As a further illustration of following the steps of my process, but using a liquid pectin, such as "Certo", two cups of water and three cups of sugar are placed in a pan, or other suitable container, and brought to a boil over a hot fire. One-half bottle of "Certo" is then added and the solution is stirred vigorously, brought to a boil and boiled for about one-half minute. The pan, or other container, is then removed from the fire. The dry solid flavoring material, prepared in accordance with the said Leo patent, is then added to the solution which is stirred to dissolve the flavoring material. When the solution has been completely dissolved, which is almost instantaneous, it is skimmed, poured into suitable containers, allowed to cool, set to a jelly and is then ready for consumption. Here again, it will be seen that the dry solid flavoring material is not added to the solution until the discontinuation of the boiling process and after the container has been removed from the fire.

It will be understood that many changes may be made and numerous details of the process may be varied through a wide range without departing from the principles of the invention, and the patent granted hereon should not therefore be limited in any way, except as may be required by the prior art.

Having described the invention, what I claim and desire to secure by Letters Patent is:

1. The process of making a food product of the class consisting of jelly, jam, preserves and marmalades having excellent color, flavor and aroma which comprises heating a mixture containing water, sucrose, acid and pectin to a temperature not substantially less than 212° F. and preferably to about 218° F. whereby to produce a substantially flavorless solution wherein the total soluble solid content thereof is approximately 65% but less than that desired in the final product, discontinuing applying heat to said solution, and then adding thereto a relatively small proportion of a solid material comprising a sugar whose normal water of crystallization is replaced by a natural fruit juice, said sugar being of a character which is readily soluble in the solution to which it is added, whereby the soluble solid content of the final product is increased simultaneously with the incorporation thereinto of the fruit flavor, no additional heat being supplied to the solution subsequent to the addition thereto of said solid material whereby there is essentially no impairment of the natural flavor, aroma and color of the natural fruit juice.

2. The process of claim 1 wherein the sugar of said solid material is a monosaccharide.

3. The process of claim 1 wherein the sugar of said solid material is dextrose.

4. The process of making a food product of the class consisting of jelly, jam, preserves and marmalades having excellent color, flavor and aroma which comprises heating a mixture containing water, sucrose and pectin to a temperature not substantially less than 212 degrees F. and preferably to about 218 degrees F. whereby to produce a substantially flavorless solution wherein the total soluble solid content thereof is less than that desired in the final product, discontinuing applying heat to said solution, and then adding thereto a relatively small proportion of a solid material comprising a sugar whose normal water of crystallization is replaced by a natural fruit juice, said sugar being of a character which is readily soluble in the solution to which it is added, whereby the soluble solid content of the final product is increased simultaneously with the incorporation thereinto of the fruit flavor, no additional heat being supplied to the solution subsequent to the addition thereto of said solid material whereby there is essentially no impairment of the natural flavor, aroma and color of the natural fruit juice.

SAMUEL LEVISON.